United States Patent [19]

Urai

[11] Patent Number: 4,873,036
[45] Date of Patent: Oct. 10, 1989

[54] METHOD OF MAKING INTEGRALLY FOAM-MOLDED SEATS

[75] Inventor: Muneharu Urai, Tokyo, Japan
[73] Assignee: Tachi-S Co. Ltd., Tokyo, Japan
[21] Appl. No.: 159,323
[22] Filed: Feb. 23, 1988
[51] Int. Cl.⁴ ............................................. B29C 67/22
[52] U.S. Cl. ................................. 264/46.6; 264/46.4; 264/46.8
[58] Field of Search ............... 264/45.1, 46.4, 46.5, 264/46.6, 46.7, 46.8; 156/79; 297/DIG. 1

[56] References Cited

U.S. PATENT DOCUMENTS

| | | | |
|---|---|---|---|
| 3,161,436 | 12/1964 | Hood | 264/46.7 |
| 3,971,112 | 7/1976 | Amato et al. | 264/46.8 |
| 4,107,829 | 8/1978 | Uari et al. | 29/91.1 |
| 4,468,490 | 8/1984 | Meyer, Jr. et al. | 156/332 |
| 4,561,917 | 12/1985 | Urai | 264/23 |
| 4,718,153 | 1/1988 | Armitage et al. | 156/79 |
| 4,786,447 | 11/1988 | Kouda | 264/46.6 |

FOREIGN PATENT DOCUMENTS

| | | | |
|---|---|---|---|
| 3606614 | 7/1987 | Fed. Rep. of Germany | 264/46.6 |
| 46-42040 | 12/1971 | Japan | 264/46.4 |
| 58-187322 | 11/1983 | Japan | 264/46.6 |
| 59-232833 | 12/1984 | Japan | 264/46.4 |
| 1325622 | 8/1973 | United Kingdom | 264/46.6 |

Primary Examiner—Jan H. Silbaugh
Assistant Examiner—Allan R. Kuhns
Attorney, Agent, or Firm—Oldham & Oldham

[57] ABSTRACT

In a method of making an integrally foam-molded seat by disposing a trim cover in a molding cavity of a mold used for molding a polyurethane foam and having a seat surface pattern embossed on its inner wall of the molding cavity, injecting a polyurethane resin solution into the molding cavity of the mold and foaming the polyurethane resin to mold the polyurethane foam integrally combined with the trim cover, a material not adhesive to the polyurethane resin is applied onto an inner surface of at least a side part of the trim cover, so that at least the side part of the trim cover may not adhere to the corresponding portion of the molded polyurethane foam, and a defect such as a void present in the moded polyurethane foam can be easily repaired is such a void is found in the product.

15 Claims, 5 Drawing Sheets

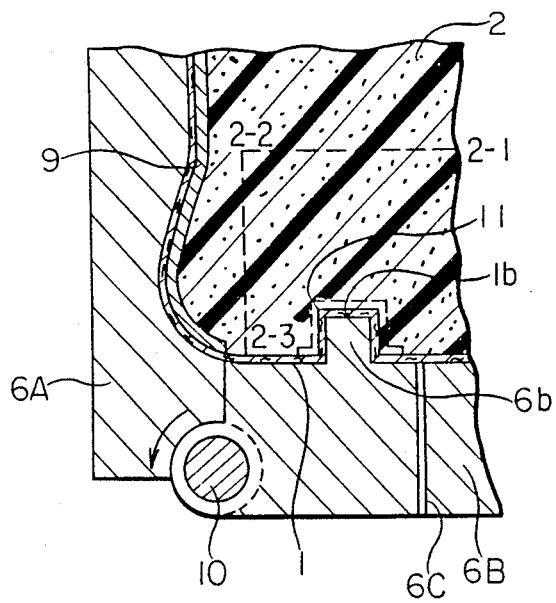
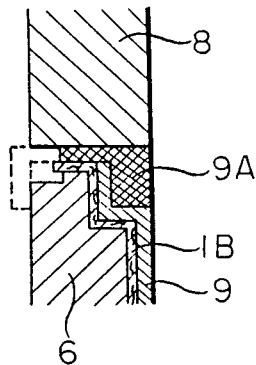
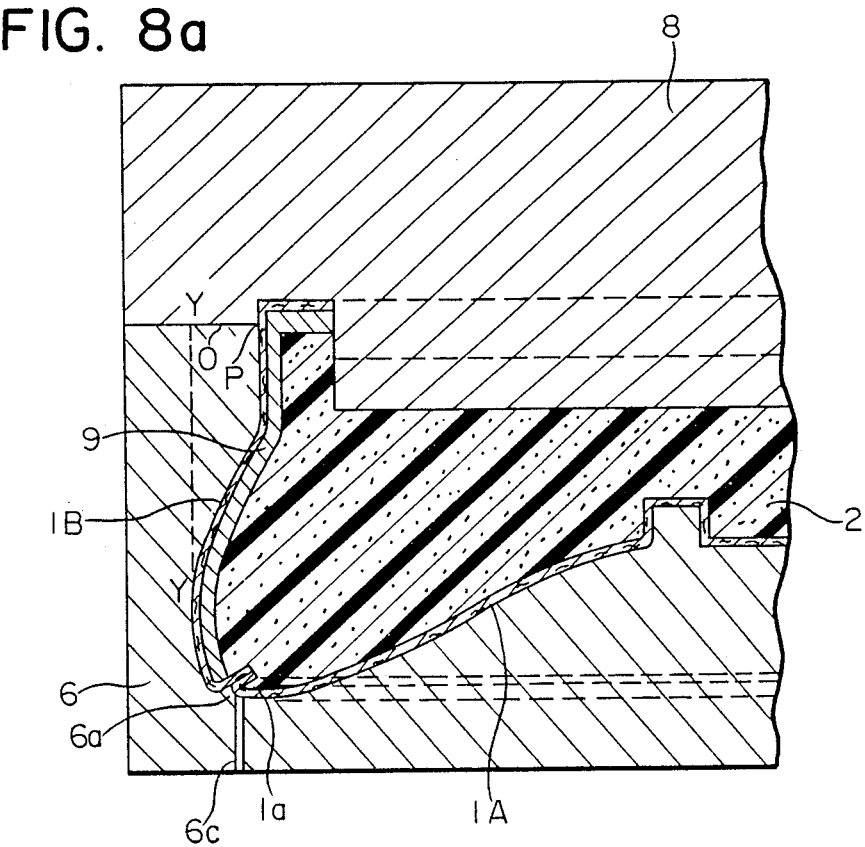

METHOD OF MAKING INTEGRALLY FOAM-MOLDED SEATS

TECHNICAL FIELD

This invention relates to seats, and more particularly to a method of making integrally foam-molded seats for use in automobiles, which facilitates and ensures accurate mounting of a trim cover during the step of foam molding, thereby minimizing the rate of production of rejects.

BACKGROUND ART

In a prior art method of making an integrally foam-molded seat, a seat trim cover is placed inside a mold to extend along the internal contour of the molding cavity the mold, and a polyurethane resin solution is directly injected onto the trim cover in the mold to make the desired integrally foam-molded seat. However, the prior art method has the following defects:

(A) It is difficult to accurately position the trim cover in the molding cavity of the mold.

(B) When a defect such as a void is found in the molded polyurethane foam, its correction is not easy, and the man-hours and materials which were required to make the molded polyurethane foam are wasted, resulting in a great industrial loss.

(C) Because the foaming pressure only is resorted to for molding the polyurethane foam integrally combined with the trim cover, the molded shape is not always accurate when the pressure is not sufficient.

DISCLOSURE OF THE INVENTION

With a view to obviate the prior art defects pointed out above, it is an object of the present invention to provide a method of making integrally foam-molded seats which facilitates accurate mounting of a trim cover in a molding cavity of a mold and which can accurately form the trim cover into the desired shape thereby minimizing production of rejects.

According to an embodiment of the method of the present invention, a mold portion having a shape conforming to the shape of the combination of the upper end of a trim cover and a trim-cover end retaining member is defined adjacent to an upper peripheral edge of a molding cavity of a lower mold, and a material not adhesive to a polyurethane resin is sprayed onto an inner surface of a side part of the trim cover or a flexible film of a material not adhesive to the polyurethane resin is attached to the inner surface of the side part of the trim cover, so that the side part of the trim cover may not adhere to the molded polyurethane foam. The trim cover is then placed along the inner wall surface of the molding cavity of the lower mold, and the polyurethane resin solution is injected into the molding cavity of the lower mold and foamed to mold the polyurethane foam integrally combined with the trim cover.

Thus, the trim cover can be accurately and quickly mounted in position in the lower mold and can be accurately shaped, thereby minimizing production of rejects.

BRIEF DESCRIPTION OF THE DRAWINGS

FIG. 1b shows a partial modification of FIG. 1a.

FIG. 2b shows a partial modification of FIG. 1a.

FIG. 7 is a sectional view of split lower molds and a pressing mold employed in another embodiment of the present invention.

FIG. 8a is a sectional view similar to FIG. 5 to show still another embodiment of the present invention.

FIG. 8b shows a partial modification of FIG. 8a.

DESCRIPTION OF THE PREFERRED EMBODIMENTS

Preferred embodiments of the present invention will now be described in detail with reference to the drawings.

Figure 1A:
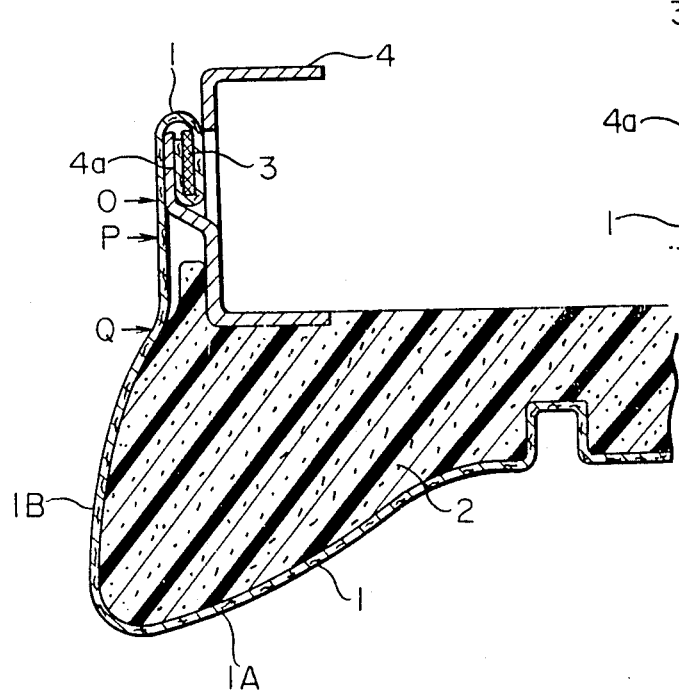
FIG. 1a is a sectional view of part of a typical front seat.

A sectional shape of a completed typical front seat is shown in FIG. 1a. The seat is illustrated upside down, and an occupant sits on the lower part in FIG. 1a.

A trim cover (or surface cover) 1 has the external shape of the seat as shown. This trim cover 1 is integrally combined with a one piece molded polyurethane foam 2 at the time of molding the polyurethane foam 2. The marginal end edge of the trim cover 1 is retained by a trim-cover end retaining member 3. A trim cover retaining portion 4a formed as a part of a seat frame 4 is inserted between the layers of the trim cover 1 retained by the trim-cover end retaining member 3 so as to fix the end of the trim cover 1 to the frame 4.

Figure 1B:
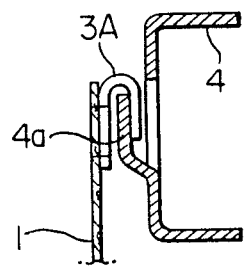

FIG. 1b shows a modification 3A of the trim-cover end retaining member 3 shown in FIG. 1a. This modification 3A has a hook-like sectional shape to serve the similar purpose.

Figure 2A:
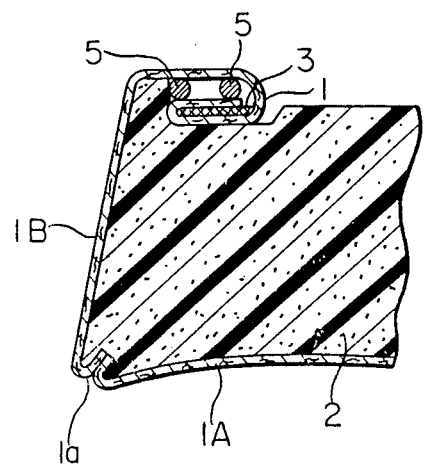
FIG. 2a is a sectional view of part of a rear seat.

FIG. 2a shows a sectional shape of a typical rear seat. In FIG. 2a, in lieu of the trim-cover retaining portion 4a, an end of a trim cover 1 and a trim-cover end retaining member 3 are held between a molded polyurethane foam 2 and two lower border wires 5 to fix the trim cover 1. The lower border wires 5 may have a plate-like shape. In another modification (not shown) of FIG. 2a, the trim cover 1 may be extended between the two border wires 5 to a position beneath one of the border wires 5 and may be retained at that end by the trim-cover end retaining member 3 disposed beneath that border wire 5. The material of a seat base part 1A of the trim cover 1 may differ from that of a side part 1B of the trim cover 1, and these 1A and 1B are joined at a trim cover joint 1a.

The material of the parts 1A and 1B of the cover 1 is woven cloth, knit cloth, non-woven cloth, artificial leather made of polyvinyl chloride resin or the like and is stretchable when so required. A filler pad (not shown) may be bonded to the trim cover 1.

An embodiment of the method of the present invention will now be described with reference to FIG. 3.

Figure 3:
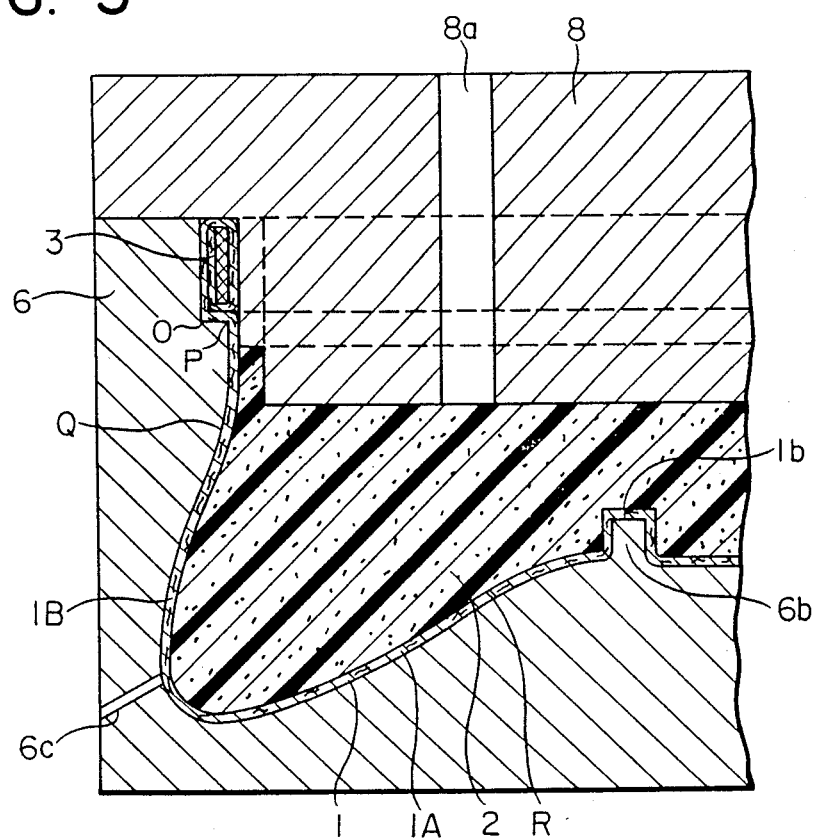
FIG. 3 is a sectional view of a lower mold and a mating upper mold employed in an embodiment of the present invention.

The portion O-P-Q of the trim cover 1 mounted on the trim cover retaining portion 4a of the seat frame 4 shown in FIG. 1a is laid along a curved surface of a molding cavity of a lower mold 6 as shown by 0-P-Q in FIG. 3. This curved surface of the molding cavity has a seat surface pattern embossed thereon. After the position of the marginal end edge of the trim cover 1 is determined between the points 0 and P of the lower mold 6, an upper mold 8 is lowered to be mated with the lower mold 6.

Then, a solution of the polyurethane resin is injected from a material injection port 8a of the upper mold 8 into the molding cavity of the lower mold 6 or injected directly into the molding cavity of the lower mold 6 without providing the injection port 8a in the upper mold 8, and the injected polyurethane resin solution is foamed. The known HR molding method foaming and molding the polyurethane resin at a high pressure, a high speed and a low temperature as well as the known HOT molding method foaming and molding the resin at a low pressure and a high temperature is applicable to the present invention. The completed external shape of the trim cover 1 shown in FIG. 1a is the same as the shape of the molding cavity of the lower mold 6 shown in FIG. 3. However, when the actual entire shape of the trim cover 1 inserted in the lower mold 6 and bent at the portion 0-P differs slightly from that shown in FIG. 3, the trim cover 1 is shaped to conform to the shape of the molding cavity of the lower mold 6 by the foaming pressure of the polyurethane resin. (The trim cover 1 will not be accurately shaped when the foaming pressure is low.)

The one piece polyurethane foam 2 molded integrally with the trim cover 1 in the lower mold 6 has an overhanging configuration. However, because the completed integral assembly of the trim cover 1 and the molded polyurethane foam 2 is soft and easily deformable, it can be easily taken out from the lower mold 6. After the assembly is taken out from the lower mold 6, the portion 0-P-Q curved in the lower mold 6 is straightened as shown in FIG. 1a.

Mold releasing material not adhesive to the polyurethane resin is sprayed onto the inner surface of the side part 1B of the trim cover 1 shown in FIG. 1a or a flexible film (not shown) of a material not adhesive to the polyurethane resin is attached to such an inner surface, so that the side part 1B of the trim cover 1 may not adhere to the corresponding part of the molded polyurethane foam 2. Further, the flexible non-adhesive film may be extended to, for example, a position R of the seat base part 1A as shown in FIG. 3. This extension of the flexible non-adhesive film increases the non-bonded area and facilitates repair of a defect such as a void, if any, that may occur in the molded polyurethane foam 2. Also, the presence of such a film prevents creasing of the bonded area. Further, in the lower mold 6 shown in FIG. 3, the part corresponding to the portion P-Q of the trim cover 1 is suitably tapered in such a relation that the gap between the upper mold 8 and the lower mold 6 is progressively narrowed in the down direction, thereby improving the airtightness between the upper mold 8 and the lower mold 6. This applies also to other embodiments.

The lower mold 6 is formed with a plurality of air vent holes 6c at necessary zones, although only one of them is shown in FIG. 3, so as to externally vent air existing between the trim cover 1 and the flexible non-adhesive film or a trim cover mounting plate 9 (FIG. 5) or the walls of the lower mold 6. The provision of such air vent holes 6c prevents occurence of a defect such as a void in the molded polyurethane foam 2. The air vent holes 6c extend into the lower mold 6 without any direct contact with the injected polyurethane resin solution and are connected to a vacuum pump (not shown), so that the flexible non-adhesive film or the trim cover mounting plate 9 and the trim cover 1 can be accurately positioned within the lower mold 6 without any gap therebetween. It is apparent that such air vent holes 6c are applied to the other embodiments.

Figure 4:
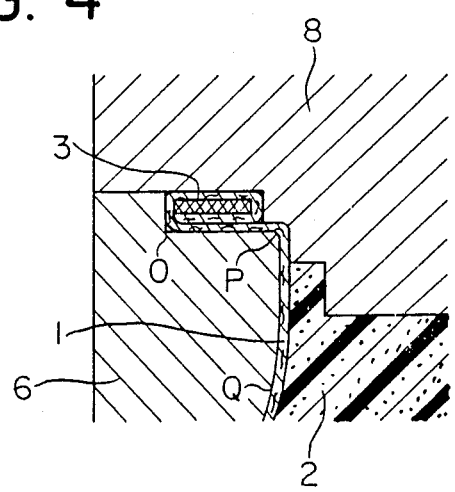
FIG. 4 shows a partial modification of FIG. 3.

FIG. 4 shows that the trim cover end retaining member 3 shown in FIG. 3 is arranged in a horizontal direction together with the part 0-P of the trim cover 1 in the lower mold 6.

The trim cover end retaining member 3 can be inserted between the trim cover 1 and the lower border wires 5 shown in FIG. 2a according to a method similar to that shown in FIGS. 3 and 4.

In the figures described above, the trim-cover end retaining member 3 is generally engaged by the entire marginal end edge of the trim cover 1, but, in some case, it may not be engaged by the entire marginal end edge of the trim cover 1.

Another embodiment of the present invention will be described with reference to FIG. 5 and FIGS. 6a, 6b and 6c.

Figure 5:
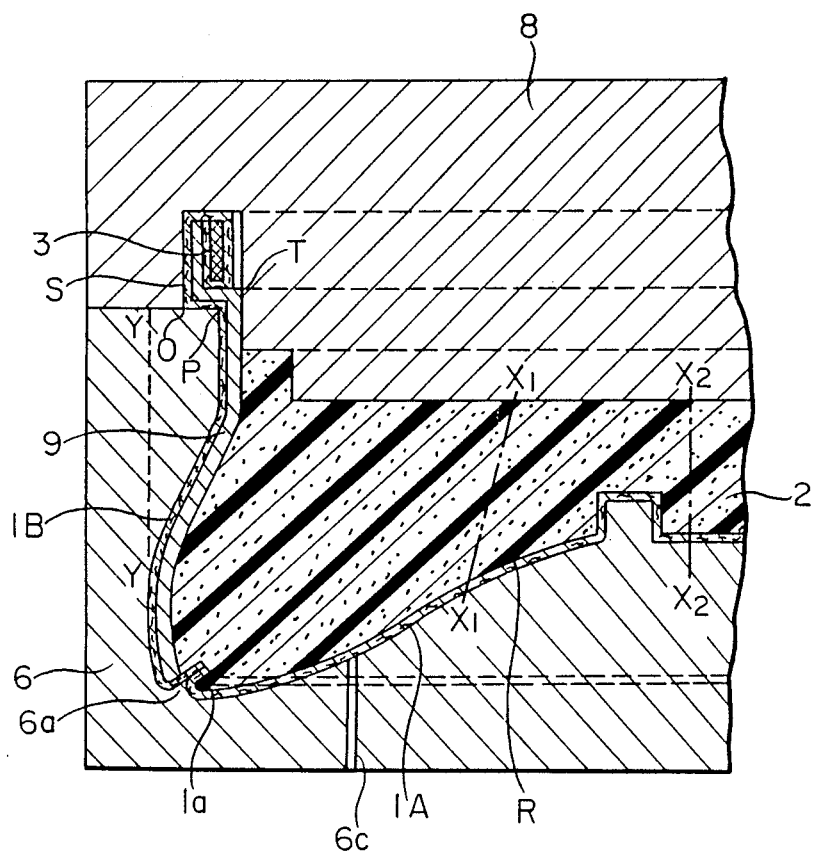
FIG. 5 is a sectional view similar to FIG. 3 to show a trim cover mounting plate additionally disposed inside the side part of the trim cover.

FIG. 5 shows a modification of FIG. 3 in that a trim cover mounting plate 9, which does not adhere to the molded polyurethane foam 2, is disposed inside the side part B of the trim cover 1. The trim cover mounting plate 9 is provided to serve the following objects: (A) The trim cover 1 can be easily previously mounted on the trim cover mounting plate 9 at the outside of the lower mold 6 within a length of time far shorter than that required for directly mounting the trim cover 1 in position in the lower mold 6. That is, the so-called pre-shaping can be easily attained; (B) The side part 1B of the trim cover 1 is previously mounted under tension on the trim cover mounting plate 9 to conform to the required shape; (C) The position of the lower end of the trim cover mounting plate 9 (the position of the trim cover joint 1a) can be accurately determined by an end supporting part 6a of the lower mold 6; and (D) Impregnation of the polyurethane resin of the molded polyurethane foam 2 into the side part 1B of the trim cover 1 can be prevented.

The seat (that is, the trim cover mounting plate 9) has a one-piece structure when no overhang is present. However, when the structure includes an overhang, it becomes necessary to split the trim cover mounting plate 9 at corners (not shown) of the seat or at a plurality of positions as, for example, shown by $X_1$-$X_1$ and $X_2$-$X_2$ in FIG. 5.

Figure 2B:
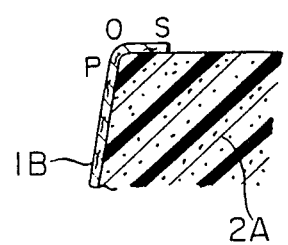

Depending on the structure of the product, an upper part S-T of the trim cover 1 may be eliminated. An example of such a product is shown in FIG. 2b. The side part 1B of the trim cover 1 may be bonded to the molded polyurethane foam 2.

Figure 6A:
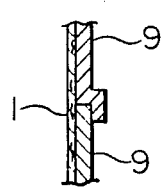
FIG. 6a, 6b and 6c are sectional views showing the shapes of the joint between the split portions of the trim cover mounting plate, respectively.
Figure 6B:
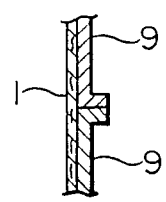
Figure 6C:
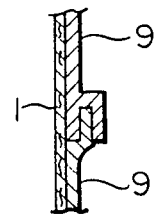

FIGS. 6a, 6b and 6c show examples of the sectional shape of the joint between the split parts of the trim cover mounting plate 9 when sectioned across the lines $X_1$-$X_1$ and $X_2$-$X_2$ in FIG. 5.

When the completed seat is to be taken out from the lower mold 6, the split parts of the mounting plate 9 joined together to form the joint as, for example, shown in FIG. 6a are separated within the lower mold 6, and the molded polyurethane foam 2 is locally compressed to take out the seat. (The split parts of the mounting plate 9 are joined as shown in FIG. 6a within the lower mold 6 before foaming and molding the polyurethane resin.)

Where the trim cover mounting plate 9 of non-split one-piece structure is required from the aspect of the shape of the seat, the lower mold 6 is preferably split into two parts along a line Y—Y shown in FIG. 5. If the trim cover mounting plate 9 can be supported in position by the cooperation of the end supporting part 6a of the lower mold 6 and the upper mold 8 even when the lower mold portion ranging between the line Y—Y and the side part 1B of the trim cover 1 may be eliminated, such a mold portion may be removed to leave a cavity. Formation of such a cavity provides the merit that the cavity can be utilized for cooling or heating the lower mold 6. The trim cover mounting plate 9 may be extended to a position R of the seat base part 1A beyond the side part 1B of the trim cover 1. The reason is the same as that described already with reference to FIG. 3.

When the trim cover mounting plate 9 of non-split one-piece structure is required, the lower mold 6 may be split into two molds 6A and 6B as shown in FIG. 7. Referring to FIG. 7 showing a modification of FIG. 5, the first lower mold 6A is rockably supported by a shaft 10, and, when so required, tilted in a direction as shown by the arrow so as to permit withdrawal (or loading) of the mounting plate 9.

Referring to FIG. 7, a pressing mold (as shown by broken imaginary lines 2-1, 2-2 and 2-3) is used to previously apply pressure and heat to a groove portion 1b of the trim cover 1 so that the groove portion 1b can be accurately shaped to conform to the shape of a convex portion 6b of the second lower mold 6B at the time of foaming and molding the molded polyurethane foam 2. When the trim cover 1 having a filler pad laminated therewith is used, the filler pad should be of the type having a thermoplasticity or a thermal deformability.

In lieu of using the pressing mold shown by the broken lines 2-1, 2-2 and 2-3 or in lieu of utilizing a vacuum means (not shown), a groove-shape maintaining member 11 as shown by the broken lines in FIG. 7 may be used to cover the groove portion 1b of the trim cover 1. This groove-shape maintaining member 11 is made of a plastic material having an elasticity and acts to press the groove portion 1b of the trim cover 1 onto the convex portion 6b of the second lower mold 6B to ensure the accurate shape of the groove. The plastic member 11 is fused by the heat generated during the step of polyurethane foaming to bond that portion 1b of the trim cover 1 to the corresponding portion of the molded polyurethane foam 2 thereby ensuring the accurate shape of the groove. According to another method, a portion of the trim cover 1 corresponding to the groove portion 1b is previously formed into the required shape by, for example, high-frequency shaping means, ultrasonic shaping means or a hot press at the outside of the lower mold 6B and, the groove-shaped portion 1b of the trim cover 1 is fitted on the convex portion 6b of the lower mold 6B.

Another modification of FIG. 5 will now be described with reference to FIG. 8a. Referring to FIG. 8a, the trim cover mounting plate 9 has the same shape as that of the side part 1B of the trim cover 1. After attaching the side part 1B of the trim cover 1 to the outer surface of the trim cover mounting plate 9, the trim cover mounting plate 9 having the trimcover side part 1B attached thereto is mounted in the molding cavity of the lower mold 6, and the upper ends of the trim-cover side part 1B and trim cover mounting plate 9 are inserted into the upper mold 8. Then, the polyurethane resin solution is injected and foamed in the molding cavity to produce the seat which is the integral combination of the trim cover 1 and the molded polyurethane foam 2. The line Y—Y shown in FIG. 8a serves a purpose similar to that described already with reference to FIG. 5.

In still another modification shown in FIG. 8b, a trim cover mounting aid 9A is used together with the trim cover mounting plate 9 to mount the side part 1B of the trim cover 1 in the molding cavity of the lower mold 6. This trim cover mounting aid 9A has an elasticity and applies pressure to the trim cover mounting plate 9 to fix it in position. The trim cover mounting plate 9 may not be used, and the flexible film described already may be used. Also, the trim cover mounting aid 9A may be externally extended as shown by dotted lines in FIG. 8b.

As described already, the trim cover mounting plate 9 may have a one-piece structure without being split into a plurality of parts. In such a case, the material of the trim cover mounting plate 9 is preferably a flexible plastic. Such a trim cover mounting plate 9 withstands a high internal temperature of the lower mold 6 (which temperature is as high as about 150 to 160° C. in the case of, for example, hot molding and as high as about 70 to 90° C. in the case of, for example, HR molding) and restores its original shape even after it is deformed. Thus, even when the lower mold 6 having a molding cavity of overhang configuration is used for molding, the trim cover mounting plate 9 of the flexible plastic material can be easily inserted into and withdrawn from the lower mold 6 and can be repeatedly used.

Figure 9:
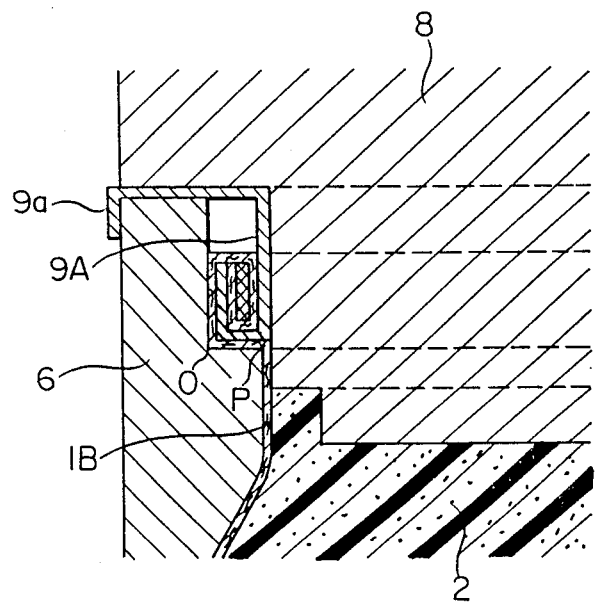
FIG. 9 is a sectional view showing another modification of FIG. 5.

FIG. 9 shows another modification of the structure shown in FIG. 5. Referring to FIG. 9, the trim cover mounting plate 9 extending along the entire side part 1B of the trim cover 1 is eliminated, and a trim cover mounting plate 9A of short length retains the upper end of the side part 1B of the trim cover 1 and has an extension 9a which is inserted between the upper mold 8 and the lower mold 6.

Figure 10:
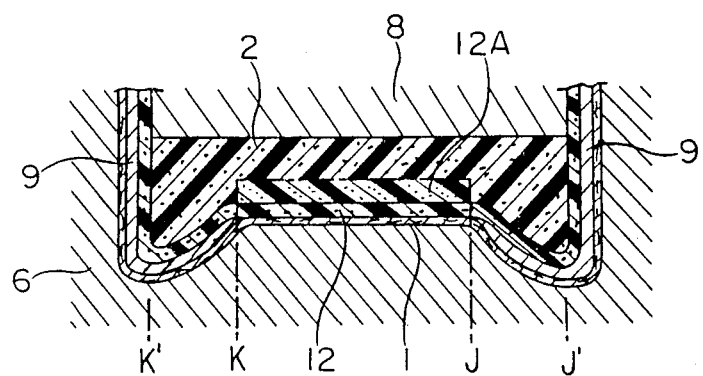
FIG. 10 shows yet another embodiment of the present invention.

FIG. 10 shows another form of the seat made according to another embodiment of the present invention. Referring to FIG. 10, a filler pad 12 is bonded to the trim cover 1, or a filler pad 12A is additionally bonded to the filler pad 12 bonded to part of the trim cover 1. (The filler pads 12 and 12A may be a one-piece pad.) Then, in a necessary range of the seat structure, such as, in a range K-J or K'-J', the polyurethane resin is foamed to be integrally molded with the combination of the trim cover 1 and the filler pad 12 or the filler pads 12, 12A. The arrangement also attains the same object as that of the various embodiments described already. Means for mounting the trim cover 1 in the molding cavity of the lower mold 6 is not shown in FIG. 10. However, it is apparent that the mounting means is the same as that illustrated in each of the various drawings or may be a suitable combination of the illustrated means. In the case of local bonding as shown in FIG. 10, a bonding method is preferred one other methods including the method of flame lamination.

A filler pad is usually bonded to the trim cover in the disclosed seat structure. As a means for bonding the filler pad to the trim cover, a bonding agent is sprayed onto the necessary area of the trim cover by a sprayer or coated by a roller. The filler pad may be flame-laminated with the trim cover. As another means, a heat-fusible film may be interposed between the trim cover and the filler pad, or powder of a heat-fusible material such as nylon is sprayed onto the surface of the trim cover or filler pad, and the filler pad is bonded to the trim cover utilizing the temperature of the molds and the heat generating during foaming the polyurethane resin. When so required, the filler pad and the trim cover may be temporarily bonded to prevent scattering of the powder.

When the filler pad or the trim cover is directly impregnated with the polyurethane resin solution, the surface of the filler pad or trim cover will be hardened due to the impregnation. In order to prevent the surface hardening due to the impregnation, a heat-fusible film is preferably placed on the surface of the filler pad, or the powder of the aforementioned heat-fusible material is preferably sprayed onto the surface of the filler pad to fill the pores of the filler pad with the powder thereby preventing or minimizing the intrusion of the polyurethane resin solution. The powder as well as the film is fused by the heat generated during foaming the polyurethane resin and also by the temperature of the molds, so that the air permeability of the trim cover molded with the polyurethane foam can be maintained.

In the case of the HR molding, the film or powder of the heat-fusible material is not used. This is because the high-speed foaming of the polyurethane resin is completed before the polyurethane resin impregnates fully into the trim cover and filler pad.

The methods described above are selectively employed depending on the seat specifications and other factors.

The present invention is not only applicable to the seats, but also applicable to other vehicle internal parts such as door pads, head rests, arm rests and instrument panels and also various articles of furniture. The method according to the present invention provides the following advantages:

(A) The prior art difficulty of accurately mounting the trim cover in the mold is eliminated by the manner of trim cover mounting shown in FIGS. 3 and 4. The manner of accurate trim cover mounting is further facilitated by employment of the trim cover mounting plate shown in FIGS. 5 to 9.

(B) In FIG. 3, the side part of the trim cover is not bonded to the molded polyurethane foam, and, in FIGS. 5 to 9, the trim cover mounting plate is used, so that the separability of the trim-cover side part from the molded polyurethane foam facilitates repair of an internal defect.

(C) The trim cover is shaped in a state attached to the outer surface of the trim cover mounting plate, so that the trim cover can be accurately shaped. Further, the use of the pressing mold shown in FIG. 7 further improves the accuracy of the shape of the trim cover.

I claim:

1. A method of making an integrally foam-molded seat by disposing a surface cover along an inner wall surface of a molding cavity of a lower mold used for molding a polyurethane foam and having a seat surface pattern embossed on said inner wall surface, injecting a polyurethane resin solution into the molding cavity of said lower mold and foaming polyurethane resin to mold the polyurethane foam integrally combined with the surface cover, said method comprising the steps of:

defining, adjacent to an upper peripheral edge of the molding cavity of said lower mold, a mold portion having a shape conforming to the shape of the combination of an upper end of the surface cover and surface-cover end retaining member;

providing a surface cover having a surface cover end retaining member along its marginal edge;

carrying out mold-releasing treatment to an inner surface of a side part of the surface cover and/or that of the portion of a seat base part of the surface cover adjacent to said side part, so that the portion of said surface cover so treated will not adhere to the molded polyurethane foam;

attaching said surface cover to an outer surface of a surface cover mounting plate having the same shape as that of a side part of said surface cover;

placing said surface cover along the inner wall surface of the molding cavity of said lower mold with said surface cover end retaining member received in said mold portion having a shape conforming to the shape of the combination of the upper end of the surface cover and the surface cover end retaining member;

injecting the polyurethane resin solution into the molding cavity of said lower mold; and foaming the polyurethane resin to mold the polyurethane foam integrally combined with those portions of said surface cover which did not receive said mold-releasing treatment.

2. A method according to claim 1, wherein said mold-releasing treatment is performed by spraying a material not adhesive to the polyurethane resin onto an inner surface of a side part of the surface cover and/or that of a required portion of a seat base part of the surface cover.

3. A method according to claim 1, wherein said mold-releasing treatment is performed by attaching a member of a material not adhesive to the polyurethane resin to said inner surface of the surface cover.

4. A method according to claim 3, wherein said member is a flexible film.

5. A method according to claim 1, wherein said lower mold is split into a plurality of molds to facilitate insertion and withdrawal of said surface cover mounting plate into and out of the molding cavity of said lower mold.

6. A method according to claim 1, wherein said surface cover mounting plate is made of a flexible plastic material which restores its original shape even when deformed, so that said mounting plate can be repeatedly used.

7. A method according to claim 1, wherein a groove portion of said surface cover is shaped by the combination of a complementary convex portion formed in the molding cavity of said lower mold and a pressing mold for heating the corresponding portion of said surface cover.

8. A method according to claim 1, wherein a groove portion of said surface cover is previously formed into a required shape at the outside of said lower mold, and said surface cover is placed at its groove portion on a complementary convex portion of said lower mold before foaming the polyurethane resin.

9. A method according to claim 1, wherein a groove-shape maintaining member of a plastic material is used to maintain the shape of a groove portion of said surface cover, and the heat generated during foaming the polyurethane resin is utilized to fuse said maintaining member thereby maintaining the shape of the groove portion between said surface cover and said molded polyurethane foam.

10. A method of making an integrally foam-molded seat by disposing a surface cover along an inner wall surface of a molding cavity of a lower mold used for molding a polyurethane foam and having a seat surface pattern embossed on said inner wall surface, injecting a polyurethane resin solution into the molding cavity of said lower mold and foaming the polyurethane resin to mold the polyurethane foam integrally combined with the surface cover, said method comprising the steps of:

attaching said surface cover to an outer surface of a trim cover mounting plate having the same shape as that of a side part of the inner wall of the molding cavity of the lower mold;

placing said surface cover along the inner wall surface of the molding cavity of said lower mold;

inserting an upper end of said trim cover mounting plate into an upper mold together with an upper end of said surface cover retained by a surface-cover end retaining member;

injecting the polyurethane resin solution into the molding cavity of said lower mold; and foaming the polyurethane resin to mold the polyurethane foam integrally combined with said surface cover.

11. A method according to claim 10, wherein, without the use of said surface-cover end retaining member, the upper end of the side part of said surface cover is integrally bonded to the molded polyurethane foam.

12. A method according to claim 1, wherein a plurality of air vent holes are provided in said lower mold and are connected to a vacuum pump to vent air from the molding cavity of said lower mold.

13. A method according to claim 1 wherein said trim cover mounting plate does not adhere to said polyurethane foam.

14. A method according to claim 1 wherein said side part of the surface cover is subjected to said mold-releasing treatment, so that said side part does not adhere to said polyurethane foam.

15. A method according to claim 1 in which said molded polyurethane foam is a one-piece element.

* * * * *